(12) United States Patent
Hirawaki et al.

(10) Patent No.: US 7,648,759 B2
(45) Date of Patent: Jan. 19, 2010

(54) COMPACT CARBON FIBER COMPOSITE MATERIAL

(75) Inventors: Satoshi Hirawaki, Wako (JP); Kazumi Ogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 147 days.

(21) Appl. No.: 11/509,814

(22) Filed: Aug. 25, 2006

(65) Prior Publication Data

US 2007/0202762 A1 Aug. 30, 2007

(30) Foreign Application Priority Data

Aug. 26, 2005 (JP) ............... 2005-245268

(51) Int. Cl.
*B32B 27/00* (2006.01)
(52) U.S. Cl. ................... 428/299.1; 442/354
(58) Field of Classification Search ......... 428/292.7, 428/297.1, 297.4, 299.1, 301.4
See application file for complete search history.

(56) References Cited

U.S. PATENT DOCUMENTS

2005/0150620 A1 * 7/2005 Hamada et al. ............. 162/152
2006/0025514 A1 * 2/2006 Miyamoto ................. 524/495

FOREIGN PATENT DOCUMENTS

JP 7-4157 A 1/1995
JP 11-300872 * 2/1999

* cited by examiner

*Primary Examiner*—Arti Singh-Pandey
(74) *Attorney, Agent, or Firm*—Arent Fox LLP

(57) ABSTRACT

A carbon fiber composite material compact contains less of expensive carbon fibers, and the compact can therefore be used for general purposes which do not require highly superior physical properties. The carbon fiber composite material compact is produced by staking a first carbon fiber layer, a core layer, a second carbon fiber layer so as to form a laminate, and then compacting the laminate while impregnating an impregnable resin therein.

3 Claims, 1 Drawing Sheet

COMPACT CARBON FIBER COMPOSITE MATERIAL

BACKGROUND OF THE INVENTION

1. Field of the Invention

The present invention relates to a carbon fiber composite material compact containing continuous fibers and having a volume content of carbon fiber of 5 to 50%, and relates to a production method therefor.

2. Background Art

Carbon fibers have superior mechanical properties (strength, elastic modulus); however, there is a problem in that they cannot be formed alone into the shape of a product.

Therefore, as a technique for solving this problem, carbon fiber composite material using resin as a matrix component has been reported in Japanese Unexamined Patent Application Publication No. H07-4157, and it has been utilized in fields of industrial parts such as parts of aircraft, automobiles, and sports gear.

However, the above carbon fiber composite material requires much time for lamination work in the compacting since bulk height (compressed thickness) of the carbon fiber is small. In addition, the carbon fiber composite material has a volume content of the carbon fiber (hereafter, Vf) of 50% or more and has superior physical properties; however, it would also be desirable to be able to use these carbon fiber composite materials in general fields which do not require such physical properties.

SUMMARY OF THE INVENTION

An object of the present invention is to provide a carbon fiber composite material compact in which by increasing bulk (thickness) of a laminate, the compounding ratio (Vf) of the carbon fiber, which is expensive, can be decreased, and utilization can be easily carried out in general fields which do not require highly superior physical properties. Furthermore, another object of the present invention is to provide a production method for a carbon fiber composite material compact in which producing processes are simplified by decreasing the number of laminates.

A carbon fiber composite material compact of the present invention comprises a first carbon fiber layer, a core layer, a second carbon fiber layer, and an impregnable resin, wherein the first carbon fiber layer, the core layer, and the second carbon fiber layer are stacked to form a laminate, and the laminate is compacted while impregnating the impregnable resin therein. In addition, a production method for a carbon fiber composite material compact of the present invention includes stacking a first carbon fiber layer, a core layer, a second carbon fiber layer so as to form a laminate, impregnating an impregnable resin having a viscosity of 100 to 20,000 mPa·s into the laminate, and curing the impregnable resin.

According to the present invention, by inserting the core layer into the center in a thickness direction of the laminate, the bulk (thickness) of the laminate can be increased, in spite of up to a 50% reduction in Vf of the carbons fiber in an optional textile thickness direction, and therefore, in-plane compression strength is superior, and bending strength and elastic modulus can be increased to the same levels as those in a compact having a Vf exceeding 50%. As a result, materials having high elastic modulus can be provided for general-purpose applications at low cost. In addition, there is also obtained an effect in which, since density of the composite material is decreased, parts produced by the composite material can be made lighter. Furthermore, according to the present invention, a laminating step in compacting is unnecessary, and therefore, the production process is simplified and the amount of time taken is reduced.

BEST MODE FOR CARRYING OUT THE INVENTION

Figure 1:
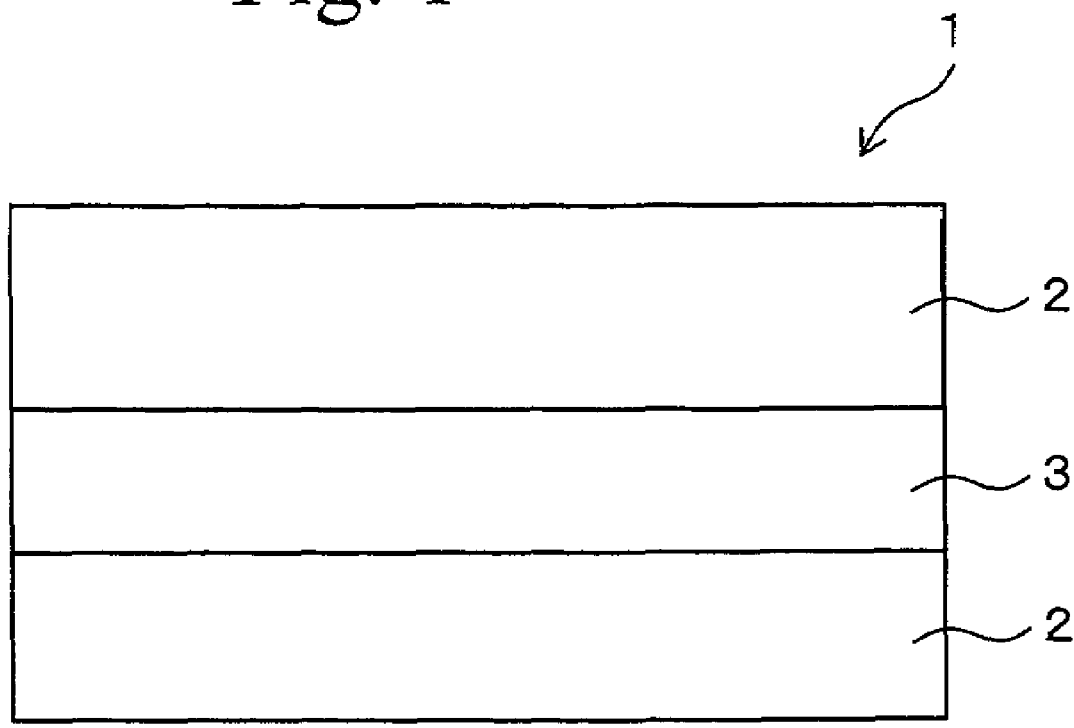
FIG. 1 is a sectional view schematically showing an embodiment of a carbon fiber composite material compact according to the present invention.

In the following, an embodiment of the present invention will be explained in detail.

FIG. 1 is a sectional view schematically showing an embodiment of a carbon fiber composite material compact according to the present invention. The carbon fiber composite material compact 1 is laminated by sandwiching a core layer 3 between two carbon fiber layers 2 which form both surface layers, and it is compacted by impregnating an impregnable resin into the laminate and by curing the resin. In the present invention, it is preferable that the carbon fiber content in the carbon fiber composite material compact be 5 to 50%. In addition, the compact can be preferably produced by a production method including a step for sandwiching a core layer between two carbon fiber layers which form both surface layers, a step for impregnating an impregnable resin having a viscosity of 100 to 20,000 Pa·s into the laminate, and a step for curing the impregnable resin.

A carbon fiber sheet in the present invention may employ a conventional prepreg; however, it is desirable that it be a carbon fiber mat in which multiple carbon fiber layers are laminated and are united by sewing using stitched threads in which these fiber sheets are penetrated in a lamination direction.

As a carbon fiber layer, a layer in which a large number of carbon fibers extend in one direction arranged in parallel, can be used, and in this case, for example, the fiber tow is one in which 1,000 to 48,000 fibers having a diameter of 7 μm are bound. As a fiber that can be used in the present invention, a filament bundle in a relatively thick tow having a total fineness of 70 to 3,000 Tex in which a large number of filaments are bundled, can be used. The fiber sheet is formed by arranging such fibers in a non-laminated condition in parallel. As a production method for the fiber sheet, a method in which fiber is pulled out from a bobbin in which the fiber is accumulated by winding, and is arranged in parallel by advancing and returning at a given span, can be used.

In such a carbon fiber mat, the carbon fiber sheets are laminated in a state in which each orientation angle of the fibers shifts every 60°. Specifically, in the case in which the longitudinal direction of the carbon fiber mat is a standard direction, fibers of two outermost carbon fiber sheets extend in a 30° shifted direction from the standard direction, fibers of two inner carbon fiber sheets than the outermost carbon fiber sheets extend in a −30° shifted direction from the standard direction, and fibers of two innermost carbon fiber sheets extend in a 90° shifted direction from the standard direction. The orientation of the fibers is arranged symmetrically at the center of a lamination direction of the carbon fiber sheets, that is, at a plane of symmetry between the two innermost carbon fiber sheets, by laminating the carbon fiber sheets in the above state.

As described above, multiple carbon fiber sheets are laminated in a state in which each orientation angle of fibers in the carbon fiber sheets shifts every 60° and in which each orientation angle of fibers is arranged symmetrically at the center of a lamination direction which is a plane of symmetry, and thereby, the carbon fiber mat has a pseudo-isotropy. In addition, the orientation angle and laminated number of the fibers are not limited to the above description and may be appropriately modified.

For example, stitched threads which unite the carbon fiber sheets are stitched in chain stitches, tricot stitches, etc., using a needle for stitching, so as to penetrate the carbon fiber sheets. The stitched threads are stitched in multiple lines along a longitudinal direction of the carbon fiber mat. The number and interval of the lines are optional, and these conditions may be appropriately modified in consideration of improvement of form-stability due to firm unification of carbon fiber sheets and ease of impregnation of resin.

The fiber of the stitch thread is not limited to a specific type; however, polyamide fiber, polyester fiber, polyaramid fiber, etc., can be used. In addition, it is desirable that the stitching thread have elastic properties, and a crimped-filament is preferably used. Furthermore, it is desirable that weight of the carbon fiber layer be about 50 to 500 g/m$^2$.

Additionally, it is desirable that the core layer in the carbon fiber composite material compact of the present invention be sandwiched at the center in a plate thickness direction of the laminate in the above weaving process of the carbon fiber sheet. Here, the cross-sectional arrangement position of the core layer is not limited to the center in a plate thickness direction, and the core layer can also be arranged properly at the outermost layer, between carbon fibers, etc., by dividing.

As a material of the core layer in the present invention, a material is necessary which has flexibility and can absorb and retain the impregnable resin, and specifically, nonwoven fabric, cut fibers, soft foam (sponge, etc.), paper, etc., can be used. In conventional carbon fiber composite material compacts used in aircraft, racing cars, etc., foamed urethane has been used as a core material. In the case in which the compact is used as a member formed in a plane shape as in the above applications, there is no problem. However, in the case in which the compact is used as a member formed in a shape having curved surfaces, such as for a fender or floor of an automobile, formation of the shape is difficult, and it is necessary that different dies be produced beforehand and that the shape be formed by foaming urethane in the die, or that the shape be formed by cutting a urethane foamed core. As a result, the manufacturing process becomes complicated, and this case is unreasonable.

As an impregnable resin in the present invention, unsaturated polyester, epoxy resin, vinylester, polymethyl methacrylate, phenol resin, modified compounds thereof, etc., can be used, and the viscosity of the resin in impregnation is preferably 100 to 20,000 mPa·s, and it is more preferably 500 to 10,000 mPa·s. When the viscosity is lower than 100 mPa·s, a desired Vf is not attained since the resin viscosity is too low. In contrast, when the viscosity exceeds 20,000 mPa·s, it is difficulty to impregnate the resin into the carbon fiber bundle.

EXAMPLES

In the following, the carbon fiber composite material compact of the present invention will be explained in detail by way of Examples and Comparative Examples.

1. Production of Carbon Fiber Composite Material Compact

Example 1

Carbon fibers (trade name: HTA-S12K-F202, produced by TOHO TENAX Co., Ltd.) were woven by a multi-axial loom produced by LIBA Maschinenfabrik GmbH, using a core layer (trade name: Span Bond 4161N (weight: 161 g/m$^2$) produced by TOYOBO Co., Ltd.) or (trade name: Span Bond 6401 (weight: 40 g/m$^2$) produced by TOYOBO Co., Ltd.), so that weight per layer was 220.5 g/m$^2$ and the orientation angles of the fibers were −30°/30°/90°/the above core layer/90°/30°/−30°, and a carbon fiber laminate was thereby produced.

Next, unsaturated polyester having a viscosity of 2,800 mPa·s (at 25° C.) was impregnated in the above carbon fiber laminate at an applied amount of 2,180 g/m$^2$, a line speed of 2 m/min, and an applied width of 400 mm, using a SMC impregnation machine produced by Tsukishima Kikai Co., Ltd.

Subsequently, the carbon fiber laminate in which the resin was impregnated as described above was cut out in 290 mm square, was set on the central area of a die having a die cavity 300 mm square, and was pressed and compacted at a die temperature of 120° C., a die closed time of 4 min, and a die closed pressure of 10 MPa, while the impregnated resin was cured, using a 100 ton press machine produced by Kawasaki Hydromechanics Corporation, and a carbon fiber composite material compact of Example 1 was thereby produced.

Comparative Example 1

Carbon fiber (trade name: HTA-S12K-F202, produced by TOHO TENAX Co., Ltd.) was woven by a multi-axial loom produced by LIBA Maschinenfabrik GmbH, so that weight per layer was 220.5 g/m$^2$ and orientation angles of fibers were −30°/30°/90°/90°/30°/−30°, and a carbon fiber laminate was thereby produced.

Next, unsaturated polyester having a viscosity of 2,800 mPa·s (at 25° C.) was impregnated in the above carbon fiber laminate at an applied amount of 940 g/m$^2$, a line speed of 2 m/min, and an applied width of 350 mm, using an SMC impregnation machine produced by Tsukishima Kikai Co., Ltd.

Subsequently, the carbon fiber laminate in which the resin was impregnated as described above was cut out in 290 mm square, was set on the central area of a die having a die cavity of 300 mm square, and was pressed and compacted at a die temperature of 120° C., a die closed time of 4 min, and a die closed pressure of 10 MPa, while the impregnated resin was cured, using a 100 ton press machine produced by Kawasaki Hydromechanics Corporation, and a carbon fiber composite material compact of Comparative Example 1 was thereby produced.

Comparative Example 2

Ten sheets of a prepreg (trade name: W3101/Q112J, produced by TOHO TENAX Co., Ltd.) was laminated so that the orientation angles of fibers were 0°/90°, and a carbon fiber laminate 300 mm square was produced.

Next, the above carbon fiber laminate was compacted at a curing temperature of 130° C., a curing time of 2 hours, and a pressure of 0.49 MPa, using a common autoclave, and a carbon fiber composite material compact of Comparative Example 2 was produced.

2. Evaluations

With respect to the carbon fiber composite material compact of the Example and Comparative Examples, the thickness of the core layer, fabric and carbon fiber laminate, Vf, bending strength, elastic modulus, tensile strength, and compression strength, were measured and evaluated according to the following methods. These results are shown in Table 1.

(1) Thickness of Core Layer, Fabric and Carbon Fiber Laminate

Thickness of the core layer, thickness of one sheet of the fabric, and thickness of the carbon fiber laminate were measured by inserting a sample in a thickness gauge (trade name: 547-321, produced by Mitutoyo Corporation).

(2) Vf (Carbon Fiber Volume Content)

First, densities of impregnable resin and carbon fiber which constitutes each carbon fiber composite material compact were measured by a device with the trade name SD-120L produced by MIRAGE Co., Ltd. Next, test pieces 15 mm square were cut out from each carbon fiber composite material compact using a diamond-cutter, and the weights thereof were measured by a device with the trade name of HM-300 produced by AND Co., Ltd. In addition, the weight of a glass filter as described below was also measured in the same manner as those of the carbon fiber composite material compacts.

Next, the above test piece was put into a 200 ml tall beaker, and 50 ml of sulfuric acid (purity of 95% or more, produced by Taisei Chemical Co., Ltd.) was added, and the impregnable resin was dissolved by heating using a heater. After it was confirmed that all impregnable resin was dissolved, 60 ml of aqueous hydrogen peroxide (produced by Kanto Chemical Co., Inc.) was added by a pipette, so as to be neutralized, and carbon fibers were broken and filtered by a glass filter while the water was drawn by an aspirator, and the fiber was washed with distilled water and acetone. Next, the carbon fiber was put in a constant temperature oven with the glass filter, and it was dried at 100° C. for 2 hours. Subsequently, the weight of the carbon fiber with the glass filter was measured in the same manner as that for the above test piece, and Vf was calculated according to the following calculated expressions.

Weight of carbon fiber=The above measured value after drying–Weight of glass filter Weight of resin=Weight of carbon fiber composite material compact–Weight of carbon fiber Volume of carbon fiber=Weight of carbon fiber/Density of carbon fiber Volume of resin=Weight of resin/Density of resin Vf=Volume of carbon fiber/(Volume of carbon fiber+Volume of resin)·100 (%)

(3) Bending Strength and Elastic Modulus

Bending strength and elastic modulus were measured in accordance with Japanese Industrial Standard JIS K7074. A test piece having a width of 15 mm and a length of 100 mm was cut from each carbon fiber composite material compact by a diamond-cutter, and it was subjected to a four-point bending test at a test speed of 5 mm/min and a bottom supporting point span of 40 times the plate thickness in mm, using a device with the trade name Autograph AG5000E produced by Shimadzu Corporation, and the bending strength and the elastic modulus were calculated by the calculation method B expression.

(4) Tensile Strength

Tensile strength was measured in accordance with JIS K7073. A test piece having a width of 25 mm and a length of 200 mm was cut from each carbon fiber composite material compact by a diamond-cutter, and it was subjected to tensile tests at a test speed of 1 mm/min, and a chuck span of 100 mm, using a device with the trade name of 5882 produced by Instron Corporation, and the tensile strength was calculated from measured values.

(5) Compression Strength

Compression strength was measured in accordance with JIS K7076. A test piece having a width of 12.5 mm and a length of 78 mm was cut from each carbon fiber composite material compact by a diamond-cutter, and it was then adhered to a tab made of GFRP by an epoxy type adhesive after an adhesion plane of the test piece and the tab was rubbed with #300 sandpaper and was degreased with acetone. Next, the test piece with the tab was subjected to a compression test according to calculation method A at a test speed of 1 mm/min and a span between tabs of 8 mm, using a device with the trade name of Autograph AG5000E produced by Shimadzu Corporation, and the compression strengths were calculated from the measured values.

TABLE 1

|  | Example 1 | Comparative Example 1 | Comparative Example 2 |
|---|---|---|---|
| Orientation Angles of Fibers | −30°/30°/90° | −30°/30°/90° | 0°/90° |
| Thickness of Core Layer (mm) | 1.10 | — | — |
| Thickness of One Carbon Fiber Layer (mm) | 0.2 | 0.2 | 0.1 |
| Thickness of One Fabric (mm) | 2.3 | 1.2 | 0.21 |
| Number of Laminates | 1 | 1 | 10 |
| Thickness of Laminate (mm) | 2.3 | 1.2 | 2.1 |
| Vf (%) | 31 | 50.1 | 51.2 |
| Density (g/cm$^3$) | 1.41 | 1.5 | 1.51 |
| Bending Strength (MPa) | 605 | 632 | 905 |
| Bending Elastic Modulus (GPa) | 69.7 | 41.8 | 53.9 |
| Tensile Strength (MPa) | 342 | 603 | 872 |
| Compression Strength (MPa) | 350 | 392 | 608 |

As is apparent from Table 1, in the carbon fiber composite material compact of Example 1, the bending elastic modulus was the highest, and the bending strength and compression strength were almost equivalent to those in Comparative Example 1, since the core layer was sandwiched, in spite of lower Vf (carbon fiber content), than those in Comparative Example 1 which did not have the core layer and Comparative Example 2 which was a conventional prepreg. That is, it was shown that the carbon fiber composite material compact of the present invention can be produced by simpler processes at lower costs than conventionally and can be used in applications in which high levels of bending strength, bending elastic modulus, tensile strength and compression strength are not necessary as in conventional prepregs.

What is claimed is:

1. A compact carbon fiber composite material comprising:
    a first carbon fiber layer;
    a core layer;
    a second carbon fiber layer; and
    an impregnable resin,
    wherein the first carbon fiber layer, the core layer, and the second carbon fiber layer are stacked to form a laminate, the laminate is compacted while impregnating the impregnable resin therein; and wherein the core layer is made of at least one of a nonwoven fabric, cut fibers, soft foam, and paper.

2. The compact carbon fiber composite material according to claim 1, wherein the impregnable resin is an unsaturated polyester, epoxy resin, vinylester, polymethyl methacrylate, phenol resin, or modified compound thereof.

3. A production method for a compact carbon fiber composite material, the method comprising:

stacking a first carbon fiber layer, a core layer, and a second carbon fiber layer so as to form a laminate, impregnating an impregnable resin having a viscosity of 100 to 20,000 mPa·s into the laminate, and curing the impregnable resin;

wherein the core layer is made of at least one of a nonwoven fabric, cut fibers, soft foam, and paper.

* * * * *